(12) United States Patent
Matheny et al.

(10) Patent No.: US 10,391,715 B1
(45) Date of Patent: Aug. 27, 2019

(54) MODIFIED SONOTRODE ASSEMBLY FOR USE IN THE ULTRASONIC SEALING OF PACKAGES

(71) Applicant: EDISON WELDING INSTITUTE, INC., Columbus, OH (US)

(72) Inventors: Mitchell Paul Matheny, Hilliard, OH (US); Beau Joseph Brown, Powell, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 0 days.

(21) Appl. No.: 16/103,094

(22) Filed: Aug. 14, 2018

(51) Int. Cl.
| | | |
|---|---|---|
| B32B 37/00 | (2006.01) |
| B29C 65/08 | (2006.01) |
| B29C 65/00 | (2006.01) |
| B23K 20/10 | (2006.01) |
| B06B 3/00 | (2006.01) |

(52) U.S. Cl.
CPC .............. B29C 65/087 (2013.01); B06B 3/00 (2013.01); B23K 20/106 (2013.01); B29C 66/73921 (2013.01)

(58) Field of Classification Search
USPC ...................................................... 156/580.2
See application file for complete search history.

(56) References Cited

U.S. PATENT DOCUMENTS

| 8,028,503 B2 * | 10/2011 | Capodieci ........... B29C 66/8246 |
| | | 156/580.2 |
| 9,056,427 B2 * | 6/2015 | Vogler .................. B29C 65/087 |
| 9,205,596 B2 | 12/2015 | Short |
| 10,029,409 B2 * | 7/2018 | Short ................... B23K 20/106 |

* cited by examiner

*Primary Examiner* — James D Sells
(74) *Attorney, Agent, or Firm* — Frost Brown Todd LLC (57) ABSTRACT

An ultrasonic welding system that includes a rotary sonotrode, having a body that includes a first horizontal side having a first antinode; a second horizontal side having a second antinode; a first vertical side having a first node; a second vertical side having a second node; and a middle region, an upper region, and a lower region, wherein the length of the middle region is greater than the length of the upper region and greater than the length of the lower region; at least one ultrasonic transducer that is transversely aligned with the rotary sonotrode; and at least one input tool disposed between the rotary sonotrode and the transducer that includes a node and is an integral part of the transducer or is a component separate from the transducer, wherein the input tool is connected to the rotary sonotrode at the middle region thereof on either the first vertical side or the second vertical side, and wherein the connection point between the input tool and the sonotrode is located a predetermined distance away from the node of the sonotrode and a predetermined distance away from the node of the input tool.

20 Claims, 8 Drawing Sheets

MODIFIED SONOTRODE ASSEMBLY FOR USE IN THE ULTRASONIC SEALING OF PACKAGES

BACKGROUND OF THE INVENTION

The described invention relates in general to a sonotrode system, assembly, and device for use in various ultrasonic applications, and more specifically to a modified sonotrode assembly for use in package sealing applications and other applications that provides enhanced performance and extended life over prior art sonotrodes of a similar nature.

Figure 3:
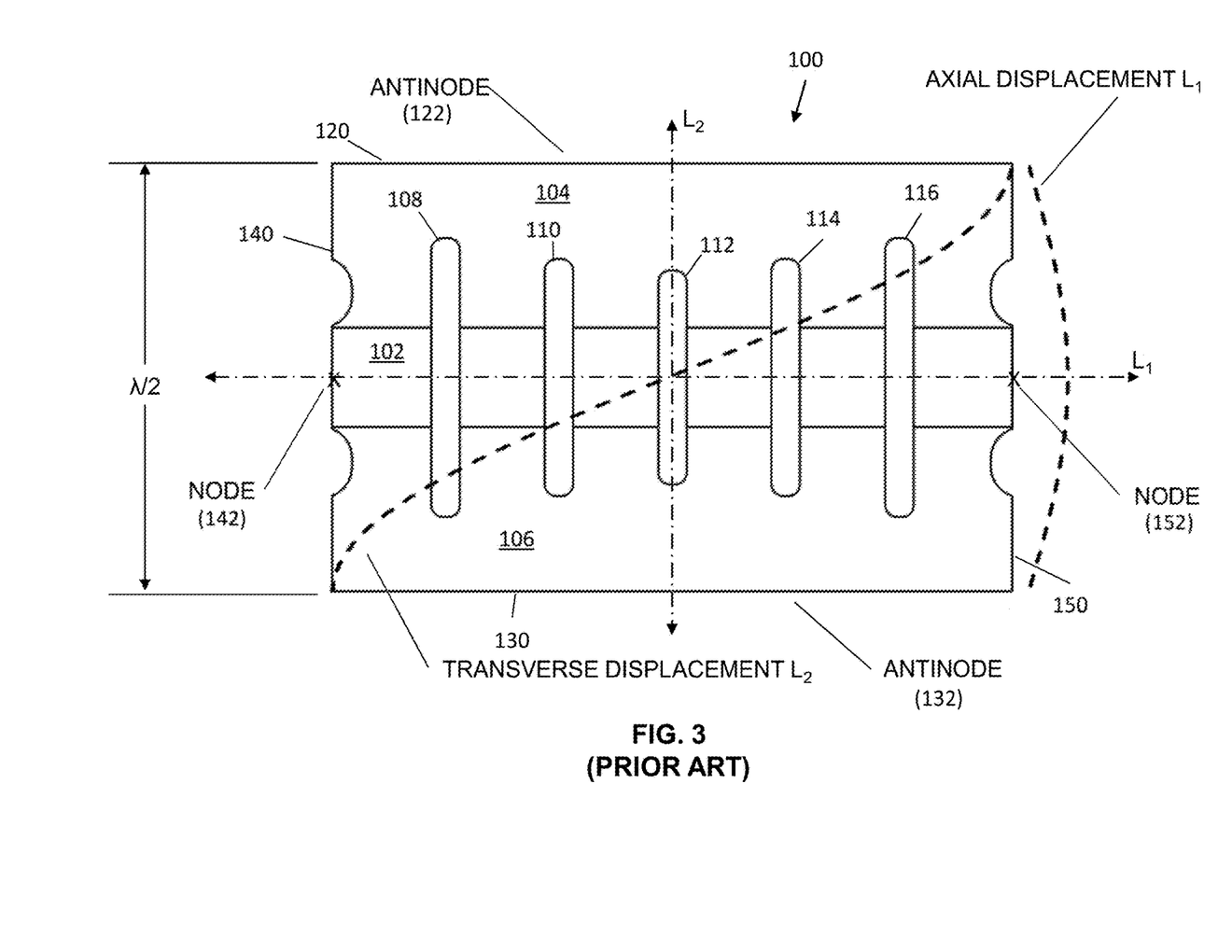
FIG. 3 is an illustration of a prior art ultrasonic sonotrode for use with a transversely aligned transducer, showing axial displacement from linear axis $L_1$ and transverse displacement from linear axis $L_2$, as well as the locations of the nodes and antinodes.
Figure 7:
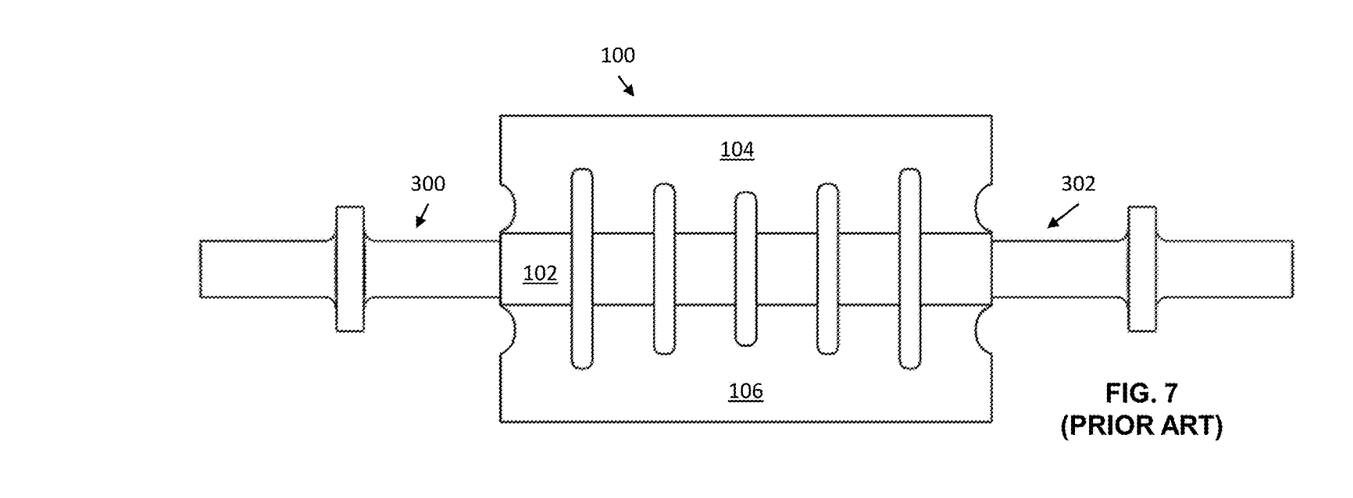
FIG. 7 is a front view of a prior art sonotrode and input tool assembly.
Figures 9, 10:
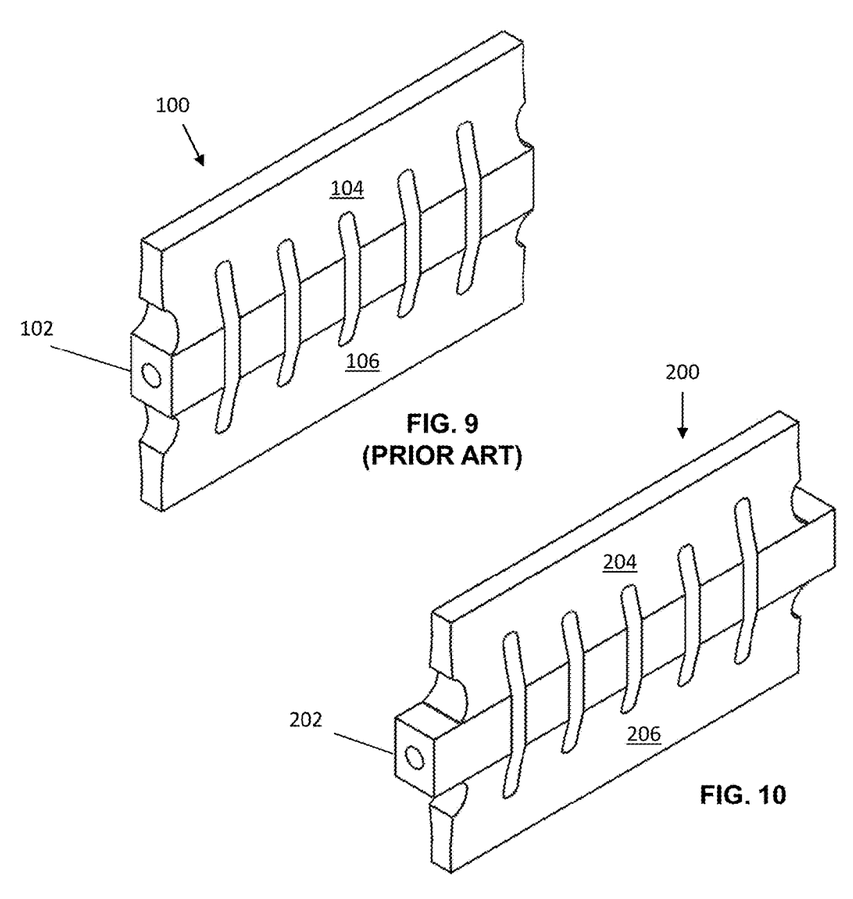
FIG. 9 is a perspective view of a prior art sonotrode.
FIG. 10 is a perspective view of a sonotrode in accordance with an exemplary embodiment of the present invention.

A sonotrode for use in ultrasonically sealing packages is disclosed in U.S. Pat. No. 9,205,596, which is incorporated by reference herein, in its entirety, for all purposes. With reference to FIGS. 3, 7, and 9 presented herein, the disclosed sonotrode includes a body with nodal and anti-nodal regions that is configured to propagate ultrasonic waves received at a nodal region along a first direction; a plurality of redirecting features (e.g., slots) formed in the body and configured to cause received ultrasonic waves propagating along the first direction to propagate along a second direction that is perpendicular to the first direction upon encountering one or more of the redirecting features; wherein the body is further configured to stretch and compress along the second direction based on corresponding peaks and valleys of the waves propagating along the second direction; and at least one ultrasonic welding surface located at an anti-nodal region of the body, wherein the at least one ultrasonic welding surface is configured to oscillate based on the stretching and compressing.

With regard to the sonotrode disclosed in U.S. Pat. No. 9,205,596 and with reference to FIGS. 3, 7, and 9 herein, the sonotrode body includes an elongated structure having antinodal regions along the long sides of the elongated structure and nodal regions along the short sides, of the elongated structure. Opposing ends of the sonotrode comprise the nodal regions and at least one of the opposing ends is configured to receive the ultrasonic waves. The redirecting features include elongated slots passing through the material of the body and extending along the second direction. In some embodiments, the elongated slots are substantially equally spaced across the body and include substantially equal widths across each slot and varying lengths along each slot. In some embodiments, the length of the elongated slots closer to the ends of the body are greater than the lengths of the elongated slots further from the ends of the body (i.e., closer to the center of the body). The thickness of the body is tapered along the second direction from a center portion of the body, extending along the first direction, to the edges of the body. The edges of the body each comprise anti-nodal regions having substantially uniform thickness along their lengths, and at least one of the anti-nodal regions comprises the at least one welding surface. The center portion of the body includes a uniform thickness along the first direction, the tapering extending from the center portion of uniform thickness to the edges.

The sonotrode disclosed in U.S. Pat. No. 9,205,596 is specifically designed for a transversely aligned ultrasonic transducer and is intended for use in rotary ultrasonic systems for sealing packages such as those used to contain food products and other items. This prior art sonotrode is effective for its intended purpose; however, the device exhibits a relatively short lifespan and after approximately four hours of operation, fractures form in the sonotrode nodal region where an ultrasonic input tool (e.g. a booster or a transducer) connects to the sonotrode during normal use. After such fractures are observed, the package sealing system must be stopped and the sonotrode must be replaced. Frequent replacement of these sonotrodes slows production time and results in significant expense. Accordingly, there is a need for a sonotrode that can be used with rotary ultrasonic systems for sealing packages and the like that is more durable and that exhibits a significantly longer lifespan than prior art sonotrodes of a similar nature.

SUMMARY OF THE INVENTION

The following provides a summary of certain exemplary embodiments of the present invention. This summary is not an extensive overview and is not intended to identify key or critical aspects or elements of the present invention or to delineate its scope. However, it is to be understood that the use of indefinite articles in the language used to describe and claim the present invention is not intended in any way to limit the described system. Rather the use of "a" or "an" should be interpreted to mean "at least one" or "one or more".

In accordance with one aspect of the present invention, a first ultrasonic welding system is provided. This ultrasonic welding system includes a rotary sonotrode, having a body that includes a first horizontal side having a first antinode; a second horizontal side having a second antinode; a first vertical side having a first node; a second vertical side having a second node; and a middle region, an upper region, and a lower region, wherein the length of the middle region is greater than the length of the upper region and greater than the length of the lower region; at least one ultrasonic transducer that is transversely aligned with the rotary sonotrode; and at least one input tool disposed between the rotary sonotrode and the transducer that includes a node and is an integral part of the transducer or is a component separate from the transducer, wherein the input tool is connected to the rotary sonotrode at the middle region thereof on either the first vertical side or the second vertical side, and wherein the connection point between the input tool and the sonotrode is located a predetermined distance away from the node of the sonotrode and a predetermined distance away from the node of the input tool.

In accordance with another aspect of the present invention, a second ultrasonic welding system is provided. This ultrasonic welding system includes a rotary sonotrode, having a body that includes a first horizontal side having a first antinode; a second horizontal side having a second antinode; a first vertical side having a first node; a second vertical side having a second node; and a middle region, an upper region, and a lower region, wherein the length of the middle region is greater than the length of the upper region and greater than the length of the lower region; at least one ultrasonic transducer that is transversely aligned with the rotary sonotrode; a first input tool disposed between the rotary sonotrode and the first transducer that includes a node and is an integral part of the first transducer or is a component separate from the first transducer, wherein the first input tool is connected to the rotary sonotrode at the middle region thereof on the first vertical side, and wherein the connection point between the first input tool and the sonotrode is located a predetermined distance away from the node of the sonotrode and a predetermined distance away from the node of the first input tool; a second ultrasonic transducer, wherein the second ultrasonic transducer is transversely aligned with the rotary sonotrode; and a second input tool disposed between the rotary sonotrode and the second transducer, that includes a node and is an integral part of the second transducer or is a component separate from the second transducer, wherein the second input tool is connected to the rotary sonotrode at the middle region thereof on the second vertical side, and wherein the connection point between the second input tool and the sonotrode is located a predetermined distance away from the node of the sonotrode and a predetermined distance away from the node of the second input tool.

In yet another aspect of this invention, a third ultrasonic welding system is provided. This ultrasonic welding system includes a rotary sonotrode, having a body that includes a first horizontal side having a first antinode; a second horizontal side having a second antinode; a first vertical side having a first node; a second vertical side having a second node; and a middle region, an upper region, and a lower region, wherein the length of the middle region is greater than the length of the upper region and greater than the length of the lower region; and a plurality of redirecting features formed vertically therein; a first input tool disposed between the rotary sonotrode and the first transducer that includes a node and is an integral part of the first transducer or is a component separate from the first transducer, wherein the first input tool is connected to the rotary sonotrode at the middle region thereof on the first vertical side, and wherein the connection point between the first input tool and the sonotrode is located a predetermined distance away from the node of the sonotrode and a predetermined distance away from the node of the first input tool; a second ultrasonic transducer, wherein the second ultrasonic transducer is transversely aligned with the rotary sonotrode; a second input tool disposed between the rotary sonotrode and the second transducer, that includes a node and is an integral part of the second transducer or is a component separate from the second transducer, wherein the second input tool is connected to the rotary sonotrode at the middle region thereof on the second vertical side, and wherein the connection point between the second input tool and the sonotrode is located a predetermined distance away from the node of the sonotrode and a predetermined distance away from the node of the second input tool; and an anvil, wherein the anvil engages the first and second horizontal sides of the sonotrode during an ultrasonic welding operation.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

A rotary ultrasonic welding system typically includes the following components: (i) a rotating horn or sonotrode that is roughly rectangular in shape and that includes two short outside edges (each short outside one edge having a node) and two long outside edges (each long outside edge having an antinode); (ii) a first booster connected to the first of the two short outside edges; (iii) a first ultrasonic transducer connected to the first booster; (iv) a second booster connected to the second of the two short outside edges; (v) a second ultrasonic transducer connected to the second booster; and (vi) a rotating anvil with which the two longer outer edges make contact during a normal welding procedure. The booster that is connected to the ultrasonic transducer may be referred to as the "input tool". Alternately, a booster may not be present and the transducer itself may be adapted to function as the "input tool".

Figure 1:
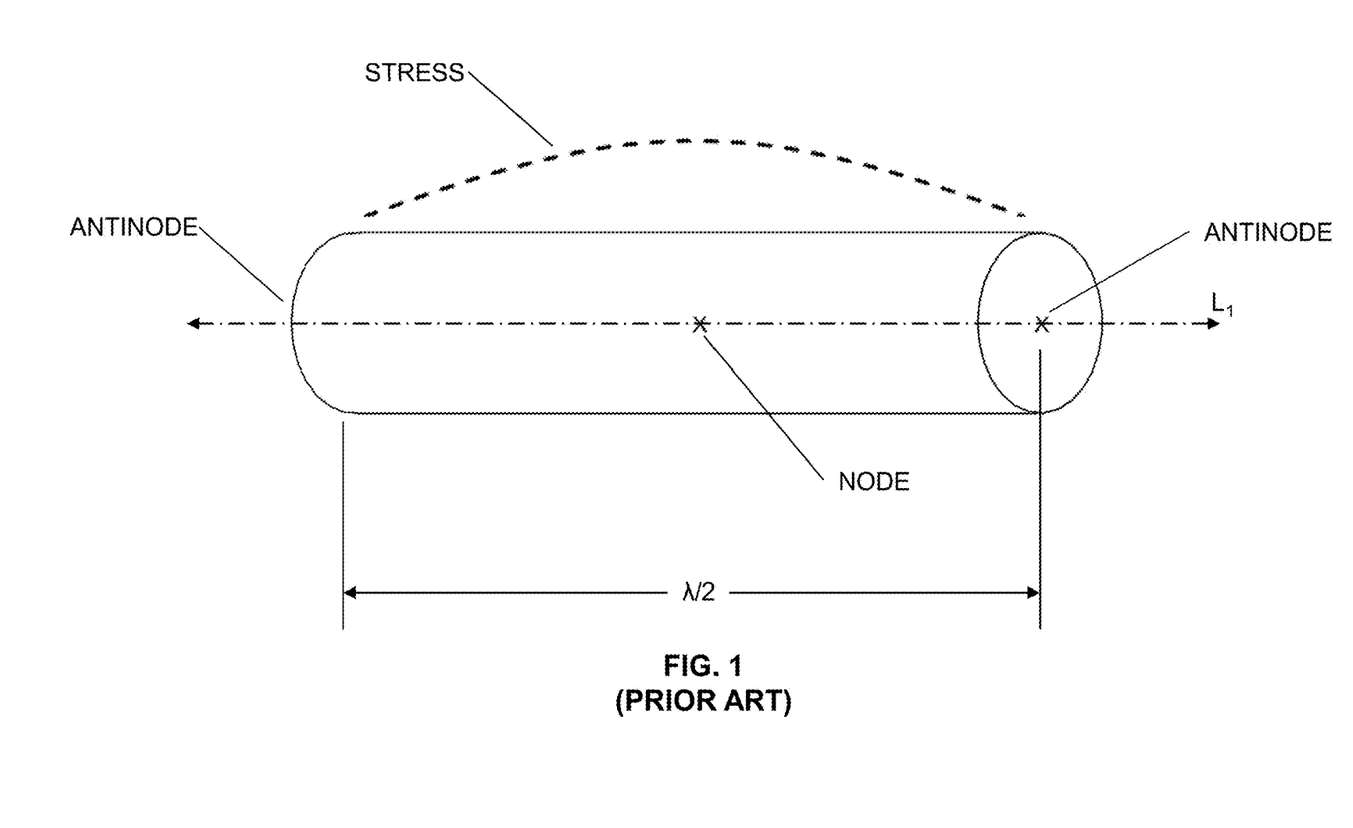
FIG. 1 is a prior art illustration of a stress profile across one-half wavelength ($\lambda/2$) of an acoustic vibration through a material along linear axis $L_1$.
Figure 2:
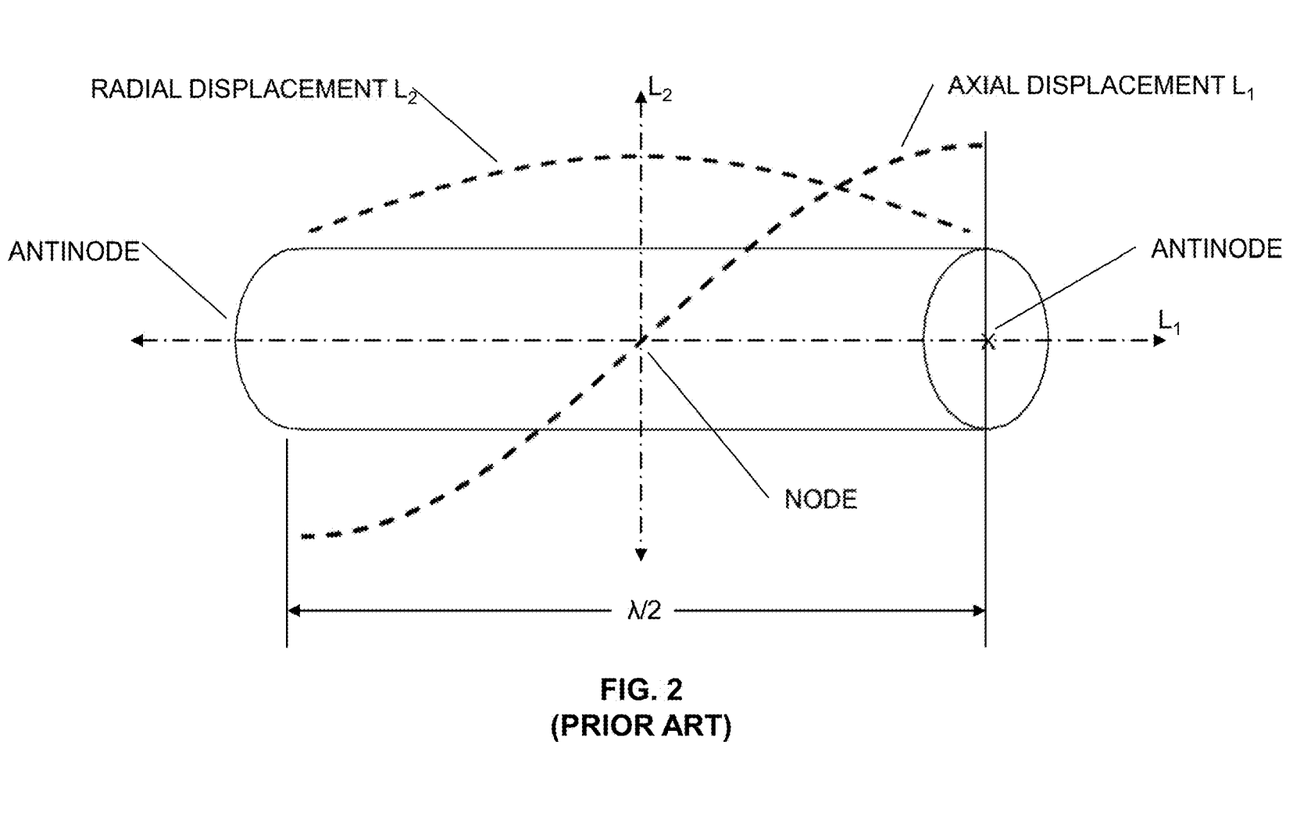
FIG. 2 is a prior art illustration of one-half wavelength ($\lambda/2$) of an acoustic vibration through a material along linear axis $L_1$.

The present invention includes a modified sonotrode for use in ultrasonic package sealing applications and other industrial applications that provides enhanced performance and extended life over prior art sonotrodes of a similar nature. In prior art ultrasonic systems, the antinode of the input tool is connected to the antinode of the sonotrode. The sonotrode antinode and input tool antinode have similar displacement vectors and therefore operate with minimal relative motion at the interface of the two devices. An ultrasonic sonotrode for a transversely mounted transducer, such as the device disclosed in U.S. Pat. No. 9,205,596, is configured such that ultrasonic input waves are received at the nodal region of the sonotrode rather than the antinode region of the sonotrode. More traditional ultrasonic welding systems typically include the use of a half wavelength input tool connected to the transducer at the input tool antinode. FIG. 1 provides an illustration of a stress profile across one-half wavelength ($\lambda/2$) of an acoustic vibration through a material along linear axis $L_1$; and FIG. 2 provides an illustration of one-half wavelength ($\lambda/2$) of an acoustic vibration through a material along linear axis $L_1$.

FIGS. 3, 7 and 9 are illustrations of prior art ultrasonic sonotrode 100, which is designed for use with a transversely aligned ultrasonic transducer, showing axial displacement from linear axis $L_1$ and transverse displacement from linear axis $L_2$, as well as the locations of the nodes and antinodes. More specifically, sonotrode 100 includes middle region or portion 102; upper region or portion 104; and lower region or portion 106. Passing completely through the material of these portions of the body of sonotrode 100 is a series of redirecting features that include first redirecting feature 108; second redirecting feature 110; third redirecting feature 114; and fifth redirecting feature 116. First horizontal outer edge 120 includes first antinode 122 and second horizontal outer edge 130 includes second antinode 132. First vertical outer edge 140 includes first node 142 and second vertical outer edge 150 includes second node 152. As shown in FIG. 7, first input tool 300 connects to first node 142 and second input tool 302 connects to second node 152.

Figure 4A:
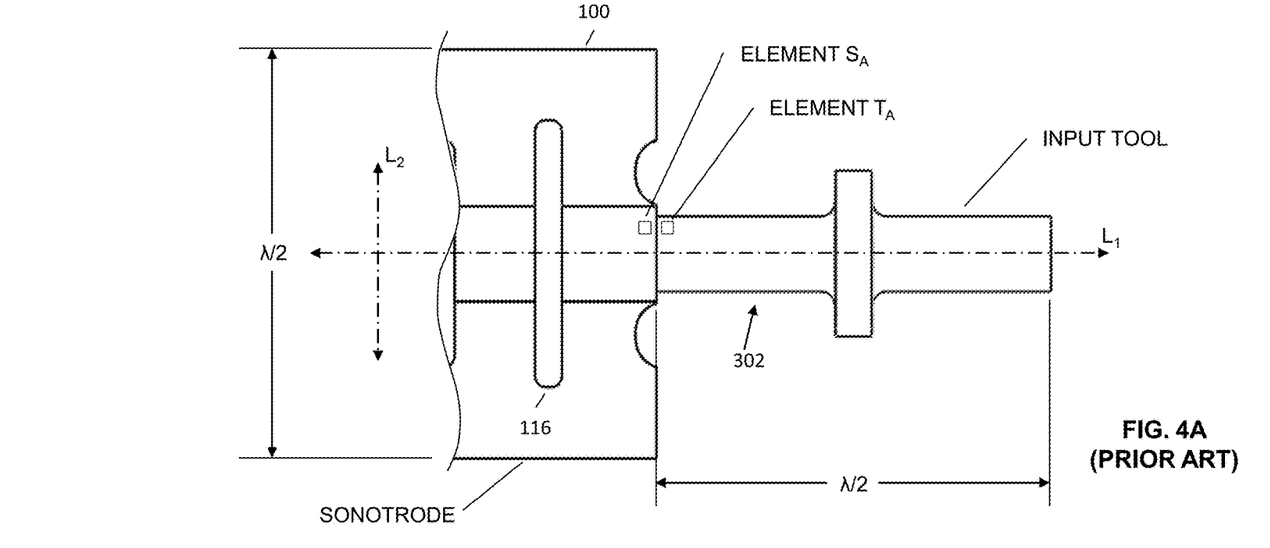
FIG. 4A is an illustration of a prior art transverse ultrasonic sonotrode connected to an input tool (e.g., a booster that is connected to an ultrasonic transducer) showing the relative locations of element $S_A$ and element $T_A$ on the sonotrode and the input tool respectively and showing the one-half wavelength ($\lambda/2$) configuration of the device.
Figure 4B:
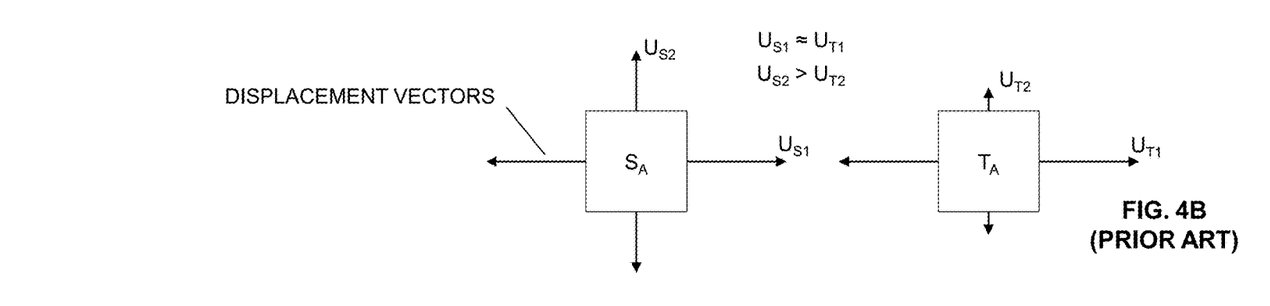
FIG. 4B is an illustration of the displacement vectors of element $S_A$ compared with the displacement vectors of element $T_A$, and further illustrating that vertical displacement vector $U_{S2}$ is greater than vertical displacement vector $U_{T2}$.

The configuration described above for rotary sonotrode 100 creates unequal displacement vectors and relative shear motion at the interface between the input tools and the sonotrode. Accordingly, sonotrode 100 is likely to fail after a relatively short period of use due to high stress occurring at each interface between an input tool and the sonotrode. This stress is generated primarily from the shear motion between the sonotrode and each input tool. Each input tool interface exhibits displacement primarily in a direction longitudinal to the axis of the input tool with minimal radial displacement. The sonotrode interface exhibits displacement in a direction longitudinal to the axis of the input tool and transverse to the axis of the input tool. The high transverse displacement of the sonotrode and the minimal radial displacement of the input tool create a relative shear motion between the sonotrode and the booster which generates shear stress. The relative shear motion also creates heat due to friction. Elevated temperature reduces the strength of sonotrode 100 and input tool 302, thereby increasing the likelihood of failure. FIG. 4A is an illustration of a prior art ultrasonic sonotrode connected to an input tool (e.g., booster coupled with an ultrasonic transducer) showing the relative locations of element $S_A$ and element $T_A$ on sonotrode 100 and input tool 302 respectively and showing the one-half wavelength ($\lambda/2$) configuration of the device. FIG. 4B is an illustration of the displacement vectors of element $S_A$ compared with the displacement vectors of element $T_A$, and further illustrating that vertical displacement vector $U_{S2}$ is greater than vertical displacement vector $U_{T2}$.

With reference to FIGS. 5, 6A-B, 8, and 10, the present invention provides an ultrasonic welding system and welding assembly that includes a modified sonotrode, wherein the sonotrode to input tool connection has been repositioned away from the node of the sonotrode toward the node of the input tool. The new connection point is not located at either the node or anti-node of sonotrode 100 or the node or anti-node of input tool 302. In the exemplary embodiment shown in FIGS. 5 and 6A, the connection between the two components is located approximately ⅛λ away from the node of sonotrode 100 and approximately ⅛λ away from the node of input tool 302. Other configurations are possible, but in all embodiments of this invention, the connection between components will not be located on a node or antinode of the component. This configuration shifts the sonotrode/input tool connection to a region of the welding assembly where the interface between the two components exhibits minimal transverse displacement and where the transverse displacement is approximately equal to the radial displacement of the input tool. This configuration also reduces the relative shear motion at the sonotrode/input tool interface, thereby reducing heat generation and shear stress. Reduction in shear stress significantly reduces any likelihood of catastrophic sonotrode failure. Reduction in heat generation improves the operational efficiency of the welding system and reduces system fault by maintaining a consistent resonant frequency.

Figure 5:
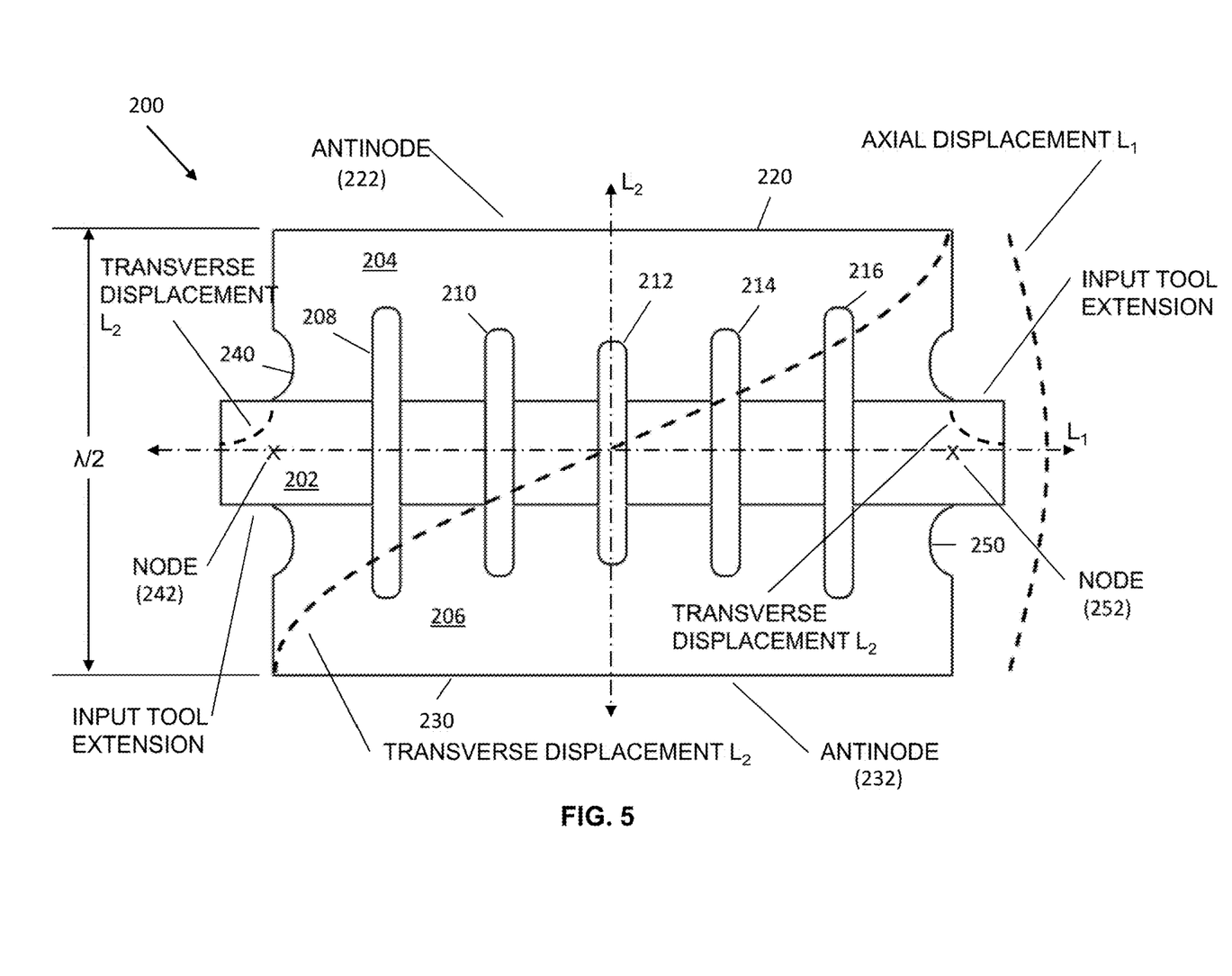
FIG. 5 is an illustration of a modified sonotrode in accordance with an exemplary embodiment of the present invention showing axial displacement from linear axis $L_1$ and transverse displacement from linear axis $L_2$, as well as additional transverse displacement from linear axis $L_2$ near the nodes on both ends of the sonotrode due to the extension of both ends of the central region or middle portion of the sonotrode body.
Figure 8:
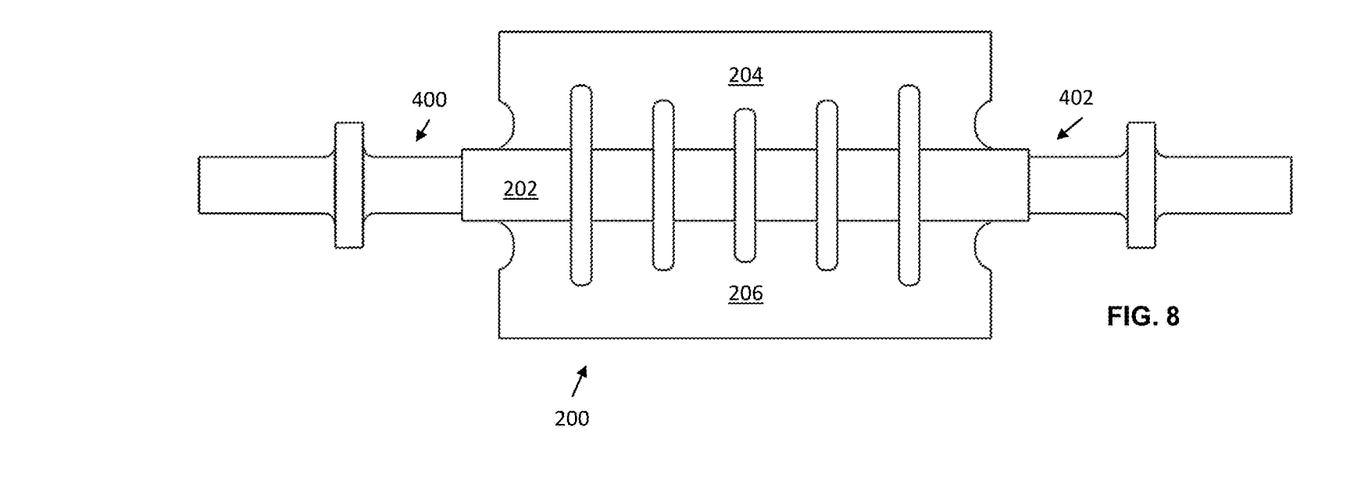
FIG. 8 is a front view of a sonotrode and input tool assembly in accordance with an exemplary embodiment of the present invention.

FIG. 5 provides an illustration of a modified rotary sonotrode in accordance with an exemplary embodiment of the present invention. More specifically, modified sonotrode 200 includes middle region or portion 202; upper region or portion 204; and lower region or portion 206. Passing completely through the material of these portions of the body of sonotrode 200 is a series of redirecting features that include first redirecting feature 208; second redirecting feature 210; third redirecting feature 212; and fifth redirecting feature 216. First horizontal outer edge 220 includes first antinode 222 and second horizontal outer edge 230 includes second antinode 232. First vertical outer edge 240 includes first node 242 and second vertical outer edge 250 includes second node 252. As shown in FIG. 8, first input tool 400 connects to first node 242 and second input tool 402 connects to second node 252.

Figure 6A:
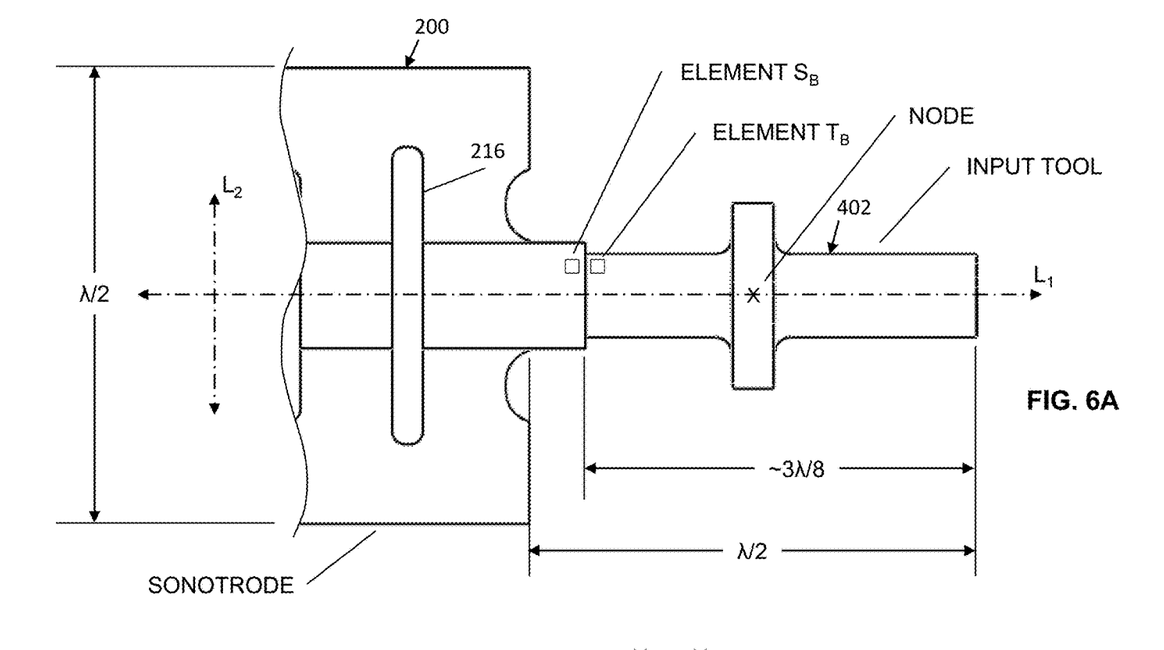
FIG. 6A is an illustration of the ultrasonic sonotrode of FIG. 5 connected to an input tool (e.g., a booster connected coupled with an ultrasonic transducer) showing the relative locations of element $S_B$ and element $T_B$ on the sonotrode and the input tool respectively and showing the three-eighths wavelength ($3\lambda/2$) configuration of the device.
Figure 6B:
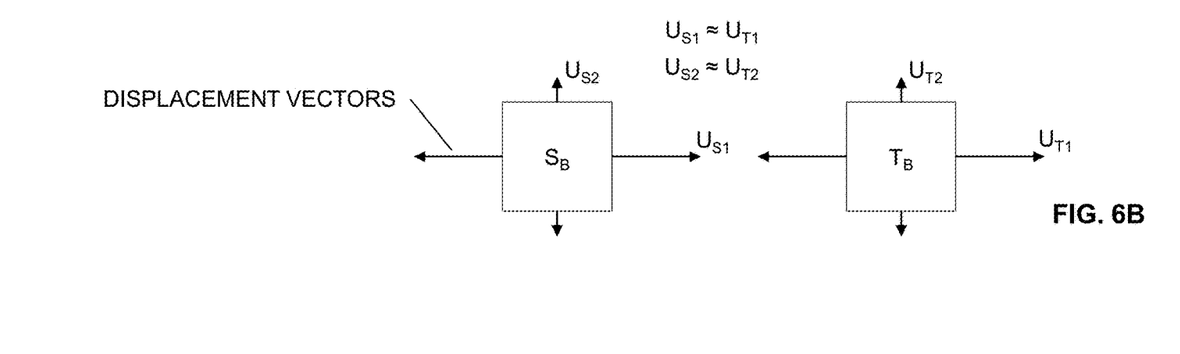
FIG. 6B is an illustration of the displacement vectors of element $S_B$ compared with the displacement vectors of element $T_B$, and further illustrating that vertical displacement vector $U_{S2}$ is equivalent to vertical displacement vector $U_{T2}$.

FIG. 5 also illustrates the axial displacement from linear axis $L_1$ and transverse displacement from linear axis $L_2$, as well as additional transverse displacement from linear axis $L_2$ near the nodes (242, 252) on both ends of modified sonotrode 200 due to the extension of both ends of middle portion 202 of the sonotrode body. FIG. 6A provides an illustration of the ultrasonic sonotrode of FIG. 5 connected to input tool 402 (e.g., a booster connected coupled with an ultrasonic transducer) showing the relative locations of element $S_B$ and element $T_B$ on modified sonotrode 200 and input tool 402 respectively and showing the three-eighths wavelength ($3\lambda/2$) configuration of the input tool. FIG. 6B is an illustration of the displacement vectors of element $S_B$ compared with the displacement vectors of element $T_B$, and further illustrating that vertical displacement vector $U_{S2}$ is equivalent to vertical displacement vector $U_{T2}$.

Ultrasonic components used with ultrasonic welding systems are typically connected to one another at the antinodes thereof because operational stresses are minimized at the antinodes. The most commonly used method for connecting these components to one another includes the use of threaded studs that function with tapped apertures or holes formed within corresponding components. However, the geometry of a tapped aperture or hole often creates one or more weak points within the ultrasonic component in which it is formed. Thus, it is desirable to locate a tapped feature near an antinode that experiences relatively low stress. Driving a sonotrode at the nodal region creates a high gain, therefor the input tool can operate at a lower than typical displacement, which equates to a lower stress level. The present invention utilizes the relatively low stresses occurring in the input tool and moves the component connection point closer to the node of the input tool. Unlike the common practice of designing ultrasonic components in half wavelength ($\lambda/2$) intervals and connecting ultrasonic components at the antinodes thereof, the present invention utilizes an ultrasonic input tool that, if examined independent of the described system, is approximately ⅜ of a wavelength ($3\lambda/2$), resulting in an input tool that is essentially off-tune (see FIG. 6A).

The ultrasonic welding system described herein includes a modified sonotrode that exhibits a significantly longer lifespan than similar sonotrodes (e.g., the transverse sonotrode disclosed in U.S. Pat. No. 9,205,596). Modified sonotrode 200 and input tools (400 and 402) were fabricated and connected to an ultrasonic transducer (e.g., Branson CH-20C) and tested under predetermined laboratory conditions. Test results indicated that the lifespan of modified sonotrode 200 increased from 4 hours under normal operating conditions to at least 152 hours. Testing was stopped prior to sonotrode failure; thus, the actual lifespan of modified sonotrode 200 is likely much greater than 152 hours. Test results also indicated that heat generation stabilized at 140° F. after multiple days of continuous operation compared to temperatures greater than 350° F., which were measured after just several minutes of operation when using previous sonotrode designs.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, a description of a technology in the "Background" is not to be construed as an admission that certain technology is prior art to any embodiment(s) in this disclosure. Neither is the "Summary" to be considered as an exhaustive characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure but should not be constrained by the headings set forth herein.

What is claimed:
1. An ultrasonic welding system, comprising:
   (a) a rotary sonotrode, wherein the rotary sonotrode includes a body and wherein the body includes:
      (i) a first horizontal side, wherein the first horizontal side includes a first antinode;
      (ii) a second horizontal side, wherein the second horizontal side includes a second antinode;
      (iii) a first vertical side, wherein the first vertical side includes a first node;
      (iv) a second vertical side, wherein the second vertical side includes a second node; and
      (v) a middle region, an upper region, and a lower region, wherein the length of the middle region is greater than the length of the upper region and greater than the length of the lower region; and
   (b) at least one ultrasonic transducer, wherein the at least one ultrasonic transducer is transversely aligned with the rotary sonotrode; and
   (c) at least one input tool disposed between the rotary sonotrode and the transducer, wherein the at least one input tool includes a node and is an integral part of the transducer or is a component separate from the transducer, wherein the input tool is connected to the rotary sonotrode at the middle region thereof on either the first vertical side or the second vertical side, and wherein the connection point between the input tool and the sonotrode is located a predetermined distance away from the node of the sonotrode and a predetermined distance away from the node of the input tool.

2. The ultrasonic welding system of claim 1, further comprising an anvil, wherein the anvil engages the first and second horizontal sides of the sonotrode during an ultrasonic welding operation.

3. The ultrasonic welding system of claim 1, wherein the sonotrode includes a horizontal axis and a vertical axis and wherein the sonotrode is tuned to one-half of a wavelength ($\lambda/2$) along the vertical axis.

4. The ultrasonic welding system of claim 1, wherein the body is substantially rectangular in shape and wherein the horizontal sides are greater in length than the vertical sides.

5. The ultrasonic welding system of claim 1, wherein the body further includes a plurality of redirecting features formed therein.

6. The ultrasonic welding system of claim 1, wherein the width of the middle region of the body is greater than the width of the upper region of the body and the width of the lower region of the body.

7. The ultrasonic welding system of claim 1, wherein the middle region of the body is tapped on both the first vertical side and the second vertical side of the sonotrode.

8. The ultrasonic welding system of claim 1, wherein the at least one input tool further includes a booster.

9. An ultrasonic welding system, comprising:
   (a) a rotary sonotrode, wherein the rotary sonotrode includes a body and wherein the body includes:
      (i) a first horizontal side, wherein the first horizontal side includes a first antinode;
      (ii) a second horizontal side, wherein the second horizontal side includes a second antinode;

(iii) a first vertical side, wherein the first vertical side includes a first node;

(iv) a second vertical side, wherein the second vertical side includes a second node; and (v) a middle region, an upper region, and a lower region, wherein the length of the middle region is greater than the length of the upper region and greater than the length of the lower region; and (b) a first ultrasonic transducer, wherein the at least one ultrasonic transducer is transversely aligned with the rotary sonotrode;

(c) a first input tool disposed between the rotary sonotrode and the first transducer, wherein the first input tool includes a node and is an integral part of the first transducer or is a component separate from the first transducer, wherein the first input tool is connected to the rotary sonotrode at the middle region thereof on the first vertical side, and wherein the connection point between the first input tool and the sonotrode is located a predetermined distance away from the node of the sonotrode and a predetermined distance away from the node of the first input tool;

(d) a second ultrasonic transducer, wherein the second ultrasonic transducer is transversely aligned with the rotary sonotrode; and (e) a second input tool disposed between the rotary sonotrode and the second transducer, wherein the second input tool includes a node and is an integral part of the second transducer or is a component separate from the second transducer, wherein the second input tool is connected to the rotary sonotrode at the middle region thereof on the second vertical side, and wherein the connection point between the second input tool and the sonotrode is located a predetermined distance away from the node of the sonotrode and a predetermined distance away from the node of the second input tool.

10. The ultrasonic welding system of claim 9, further comprising an anvil, wherein the anvil engages the first and second horizontal sides of the sonotrode during an ultrasonic welding operation.

11. The ultrasonic welding system of claim 9, wherein the sonotrode includes a horizontal axis and a vertical axis and wherein the sonotrode is tuned to one-half of a wavelength ($\lambda/2$) along the vertical axis.

12. The ultrasonic welding system of claim 9, wherein the body is substantially rectangular in shape and wherein the horizontal sides are greater in length than the vertical sides.

13. The ultrasonic welding system of claim 9, wherein the body further includes a plurality of redirecting features formed therein.

14. The ultrasonic welding system of claim 9, wherein the width of the middle region of the body is greater than the width of the upper region of the body and the width of the lower region of the body.

15. The ultrasonic welding system of claim 9, wherein the middle region of the body is tapped on both the first vertical side and the second vertical side of the sonotrode.

16. An ultrasonic welding system, comprising:

(a) a rotary sonotrode, wherein the rotary sonotrode includes a substantially rectangular body and wherein the body includes:

(i) a first horizontal side, wherein the first horizontal side includes a first antinode;

(ii) a second horizontal side, wherein the second horizontal side includes a second antinode;

(iii) a first vertical side, wherein the first vertical side includes a first node;

(iv) a second vertical side, wherein the second vertical side includes a second node;

(v) a middle region, an upper region, and a lower region, wherein the length of the middle region is greater than the length of the upper region and greater than the length of the lower region; and (vi) a plurality of redirecting features formed vertically therein; and (c) a first input tool disposed between the rotary sonotrode and the first transducer, wherein the first input tool includes a node and is an integral part of the first transducer or is a component separate from the first transducer, wherein the first input tool is connected to the rotary sonotrode at the middle region thereof on the first vertical side, and wherein the connection point between the first input tool and the sonotrode is located a predetermined distance away from the node of the sonotrode and a predetermined distance away from the node of the first input tool;

(d) a second ultrasonic transducer, wherein the second ultrasonic transducer is transversely aligned with the rotary sonotrode;

(e) a second input tool disposed between the rotary sonotrode and the second transducer, wherein the second input tool includes a node and is an integral part of the second transducer or is a component separate from the second transducer, wherein the second input tool is connected to the rotary sonotrode at the middle region thereof on the second vertical side, and wherein the connection point between the second input tool and the sonotrode is located a predetermined distance away from the node of the sonotrode and a predetermined distance away from the node of the second input tool; and (f) an anvil, wherein the anvil engages the first and second horizontal sides of the sonotrode during an ultrasonic welding operation.

17. The ultrasonic welding system of claim 16, wherein the sonotrode includes a horizontal axis and a vertical axis and wherein the sonotrode is tuned to one-half of a wavelength ($\lambda/2$) along the vertical axis.

18. The ultrasonic welding system of claim 16, wherein the horizontal sides are greater in length than the vertical sides.

19. The ultrasonic welding system of claim 16, wherein the width of the middle region of the body is greater than the width of the upper region of the body and the width of the lower region of the body.

20. The ultrasonic welding system of claim 16, wherein the middle region of the body is tapped on both the first vertical side and the second vertical side of the sonotrode.

* * * * *